United States Patent [19]

Morelli et al.

[11] Patent Number: 4,939,456
[45] Date of Patent: Jul. 3, 1990

[54] POSITION SENSOR INCLUDING A THIN FILM INDIUM ARSENIDE MAGNETORESISTOR ON A PERMANENT MAGNET

[75] Inventors: Donald T. Morelli, Walled Lake; Joseph P. Heremans, Troy; Dale L. Partin, Sterling Heights; Christopher M. Thrush, Utica; Louis Green, Rochester Hills, all of Mich.

[73] Assignee: General Motors Corporation, Detroit, Mich.

[21] Appl. No.: 426,249

[22] Filed: Oct. 25, 1989

Related U.S. Application Data

[63] Continuation-in-part of Ser. No. 289,641, Dec. 23, 1988, abandoned.

[51] Int. Cl.$^5$ .................... G01B 7/14; G01R 33/02; H03K 17/90; H01L 27/22
[52] U.S. Cl. ................... 324/207.21; 324/252; 307/309; 338/32 R; 357/27
[58] Field of Search ............ 324/207, 208, 235, 252; 307/309; 338/32 R; 357/27

[56] References Cited

PUBLICATIONS

S. Kataoka, "Recent Developments of Magnetoresistive Devices and Applications", *Circulars of the Electrotechnical Laboratory No.* 1982, Agency of Industrial Science and Technology, Tokyo (Dec. 1974).
H. H. Wieder, "Transport Coefficients of Indium Arsenide Epilayers", *Applied Physics Letters*, vol. 25, No. 4, pp. 206-208 (15 Aug. 1974).
G. Burns, *Solid State Physics Sections 18-5 and 18-6*, pp. 726-747, Academic Press, Inc., Harcourt Brace Jovanovich, Publishers, New York, 1985.
H. P. Baltes and R. S. Popovic, "Integrated Semiconductor Magnetic Field Sensors", *Proceedings of the IEEE*, vol. 74, No. 8, pp. 1107-1132 (Aug. 1986).
S. Kalem, J.-I. Chyi and H. Morkoc, "Growth and Transport Properties of InAs Epilayers on GaAs", *Applied Physics Letters*, vol. 53, No. 17, pp. 1647-1649 (24 Oct. 1988).

*Primary Examiner*—Reinhard J. Eisenzopf
*Assistant Examiner*—Walter E. Snow
*Attorney, Agent, or Firm*—Robert J. Wallace

[57] ABSTRACT

For increased sensitivity, an improved position sensor includes a magnetic circuit in which the stationary portion includes a permanent magnet whose width is optimally 1.5 times the tooth pitch of the exciter portion of the sensor and the magnet face proximate the exciter includes a thin layer of ferromagnetic material over which is centered a narrow magnetic sensing element, such as a magnetoresistor. The sensing element has a width typically less than the tooth width. The sensing element includes a thin film of a monocrystalline semiconductive material, preferably having only a moderate bulk mobility and a larger band gap, such as indium arsenide. Current carriers flow along the length of the thin film in a surface accumulation layer, effective to provide a significant apparent increase in mobility and conductivity of said semiconductive material, and an actual increase in magnetic sensitivity and temperature insensitivity. The flux density is typically applied by appropriate magnet thickness or choice of magnet material without the need of a flux guide.

22 Claims, 10 Drawing Sheets

MAGNETORESISTOR InAs/InP
SENSISTIVITY AT 0.4 Tesla

MAGNETORESISTOR InAs/InP

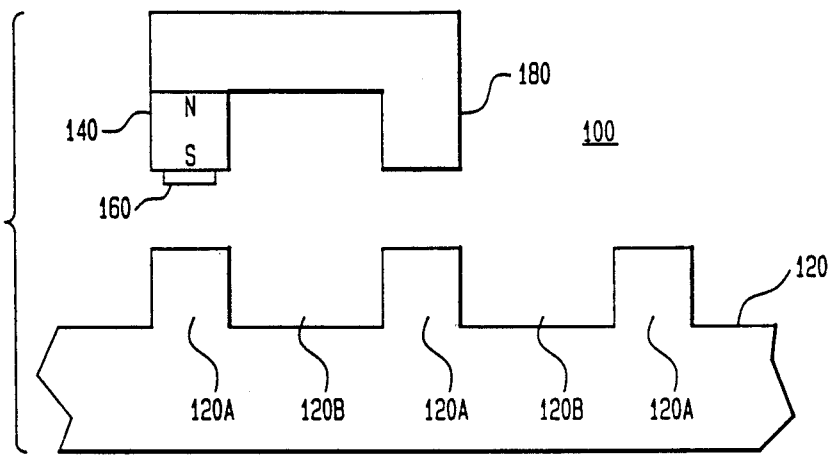
FIG. 13
(PRIOR ART)
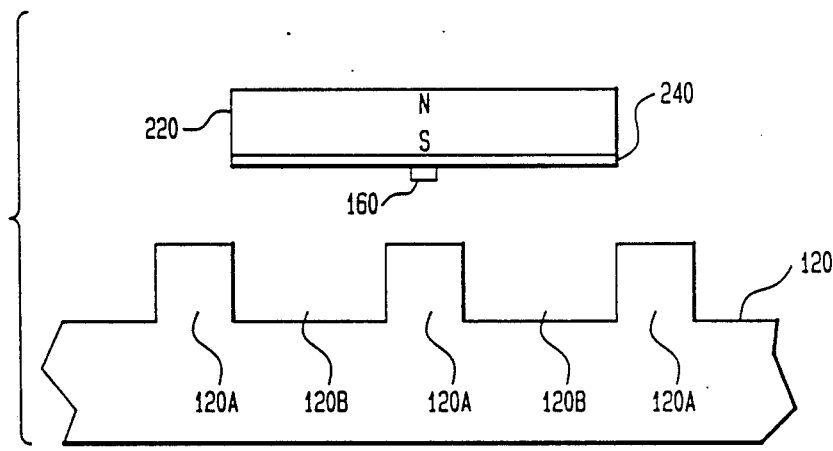
FIG. 14
FIG. 15
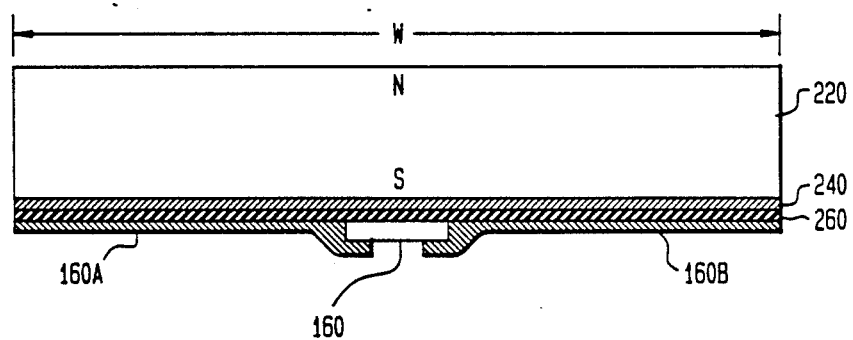

POSITION SENSOR INCLUDING A THIN FILM INDIUM ARSENIDE MAGNETORESISTOR ON A PERMANENT MAGNET

CROSS-REFERENCE

This is a continuation-in-part of our pending U.S. patent application Ser. No. 289,641, filed Dec. 23, 1988, now abandoned.

COPENDING PATENT APPLICATIONS

This patent application is related to the following concurrently filed United States patent applications, which are assigned to the same assignee to which this patent application is assigned:

Ser. No. 289,634 entitled, "Indium Arsenide Magnetoresistor," and filed on Dec. 23, 1988 in the names of Joseph P. Heremans and Dale L. Partin, now abandoned; and Ser. No. 289,646 entitled, "Improved Magnetoresistor," and filed on Dec. 23, 1988 in the names of Dale L. Partin, Joseph P. Heremans and Donald T. Morelli. Continuations-in-part of both of the foregoing concurrently filed applications are being filed with this application.

This patent application is also related to the following earlier filed United States patent application, which also is assigned to the assignee of this invention;

Ser. No. 229,396 entitled, "Position Sensor," and filed in the names of Thaddeus Schroeder and Bruno P. B. Lequesne on Aug. 8, 1988.

While not believed to relate specifically to the invention claimed herein, the following copending United States patent applications are mentioned because they also relate to magnetic field sensors and are assigned to the assignee of this patent application:

Ser. No. 181,758 entitled, "Magnetic Field Sensor," and filed Apr. 14, 1988 in the names of Dale L. Partin and Joseph P. Heremans, now Patent No. 4,843,444; and Ser. No. 240,778 entitled, "Magnetic Field Sensors," and filed Sept. 6, 1988 in the names of Joseph P. Heremans and Dale L. Partin.

FIELD OF THE INVENTION

This invention relates to a position sensor and, more particularly, to an improved magnetic field sensing system having an improved magnetoresistive sensor for detecting changes in magnetic flux passing through a magnetic flux sensitive element.

BACKGROUND OF THE INVENTION

This invention is a further improvement on the improved magnetic field sensing system already being described and claimed in the above-identified United States patent application Ser. No. 229,396, filed in the names of Thaddeus Schroeder and Bruno P. B. Lequesne and entitled, "Position Sensor."

The need for accurately and easily sensing position, speed or acceleration is growing, particularly in the automotive field. Anti-lock braking systems, traction control systems, electric power steering, four-wheel steering and throttle control are examples of functions that can use such sensing. Such applications not only require accuracy and precision, but frequently involve severe environments. Cost of such systems is an important factor, too.

For such applications, it is desirable to have a position sensor (speed and acceleration can be derived from a position signal) that is rugged and reliable, small and inexpensive, capable of low (including zero) speed sensing and relatively immune to electromagnetic field interference from the other systems used in an automobile.

A well-known form of position sensor is a semiconductor magnetoresistive sensor. Such a sensor comprises a magnetic circuit that includes two basic parts. One of these parts, typically kept stationary, includes a semiconductive sensing element that is sensitive to the magnetic flux density passing through its surface, and further includes a permanent magnet for creating a reference flux. The other of the two parts, termed the exciter, includes a high magnetic permeability element with a series of teeth that moves with relation to the stationary element for changing the reluctance of the magnetic circuit and for causing the magnetic flux through the sensing element to vary in a fashion corresponding to the position of the teeth.

Such a sensor is sensitive to the magnetic flux density rather than to the rate of flux density change and so it does not have a lower speed limit. This also makes it less sensitive to E.M.I. Moreover, its response is predictably related to the distribution of flux density over the surface of the sensing element.

Typically, the stationary part includes a magnetoresistive element, including a semiconductive element whose resistance varies with the magnetic flux density passing through it in controllable fashion so that an electrical output signal can be derived. Moreover, when this magnetoresistor is produced from a high electron mobility semiconductor, such as compound semiconductors like indium antimonide or indium arsenide, a large electrical output signal can be available. If the output signal is sufficiently large, there is the possibility of providing an output signal that requires little or no further amplification, a factor of considerable advantage. It is desirable to have a position sensor of high sensitivity so that a large electrical output signal can be produced efficiently and of easy manufacture so that it can be made reliably and at low cost.

The magnitude of the flux variations in the sensing element for a given change in position of the exciter is an important factor in determining the sensitivity of the sensor. Accordingly, a variety of designs have been attempted hitherto to maximize the change in the flux density through the sensor in response to a given change in exciter position. Typically, these attempts involved including a flux guide for the permanent magnet included in the stationary part of the magnetic circuit to provide a return path for the magnetic field of the magnet. Additionally, sometimes a field concentrator of commensurate size has been provided contiguous to the magnetoresistive element to concentrate flux through the magnetoresistive element.

However, for example, such techniques have typically produced magnetic circuit sensitivities no higher than about five percent for a typical exciter design having a three millimeter tooth pitch and one millimeter gap, where the sensitivity is defined as the difference between the maximum and minimum flux densities sensed divided by the mean flux density sensed (half the sum of the maximum and minimum flux densities sensed).

Previously referred to U.S. patent applications Ser. No. 289,634 and Ser. No. 289,646 describe the fabrication and properties of a new type of magnetoresistor thin film element. Application Ser. No. 289,634 details the process of growing a low to moderate conductivity thin film of indium arsenide (InAs), a narrow-gap semiconductor, on a semi-insulating indium phosphide (InP) substrate, and shows that this device has a rather large sensitivity of electrical resistance to magnetic field. Application Ser. No. 289,646 outlines various methods of enhancing the sensitivity of the device on the basis of the existence of a thin surface layer (known as an accumulation or inversion layer) of high density, high mobility electrons. Such electron accumulation or strong inversion layers can be induced in a variety of semiconductor thin films materials. While the devices described therein could be used in a wide variety of magnetic field sensing applications without significant further development, the application of these magnetoresistors as position sensors in more stringent operating conditions (such as those which exist in an automobile) requires interfacing the magnetoresistor with a suitable sensing system.

We have recognized that the Schroeder and Lequesne (USSN 229,396) type of magnetic circuit is so effective in concentrating the magnetic field that lesser sensitive magnetoresistors may still work well enough to be useful at some applications. In addition, we have recognized that some of the less sensitive magnetoresistor materials are magnetically sensitive at higher temperatures. We have also recognized that the improved magnetoresistor concepts of USSN 289,634 and USSN 289,646 provide enhancement to lesser magnetically sensitive materials. We have thus recognized that the combination of all these concepts could provide especially striking benefits. This patent application specifically describes and claims that combination.

There are several reasons why the improved magnetoresistors described in USSN 289,634 and 289,646 would be especially desirable for use in such a sensing system. The reasons will not be mentioned in order of importance. First, extreme compactness of these sensors make their use ideal in any sensing location, regardless of the space limitations. Secondly, their improved sensitivity to magnetic field affords the designer a large amount of freedom in the placement of the sensor with respect to the exciter wheel. This means that the air gap between exciter and sensor can be larger than for a less sensitive device without any diminution in magnitude of the electrical signal. This could prove to be important in applications where vibration and thermal expansion problems limit the degree of proximity of the sensor to the exciter wheel. Also, the outstanding temperature stability of the sensitivity of the improved magnetoresistors will allow their application in extreme temperature environments, such as automotive anti-lock braking systems, in which temperatures can range from $-50°$ C. to $+200°$ C. Other applications may require operation at temperatures as high as $+300°$ C. We believe that the enhancement to system sensitivity afforded by the USSN 229,396 concepts and the enhancement to magnetoresistor sensitivity afforded by the USSN 289,634 and USSN 289,646 concepts, in combination, makes a wider group of semiconductor materials now available for use in magnetic field sensing. Materials that were previously considered as unacceptable now can be used, and will provide acceptable performance at much higher temperature. This expands the range of applications where such sensing is practical, and provides other benefits as well.

Accordingly, we think that the combination proposed in this patent application is especially attractive for automotive applications as part of linear or rotary position measurement systems. The sensitivity to magnetic field and high thermal stability of these sensors would be especially beneficial.

SUMMARY OF THE INVENTION

The present invention is directed to a novel magnetic circuit for use in a position sensor. It features a novel type of magnetoresistor that significantly improves the circuit. The combination is simple and planar in geometry, which makes it amenable for batch processing with a consequent saving in manufacturing cost. Moreover, it makes possible attainment of sensitivities and/or sensing at higher temperatures appreciably higher than prior art structures.

In particular, the novel magnetic circuit employs a stationary part that comprises a permanent magnet whose width is several times wider than that of the magnetic sensing element and, advantageously, at least about one and one-half times the pitch of the exciter teeth. The sensing element is a magnetoresistor having an accumulation layer on its sensing area surface. Moreover, in the preferred embodiment for further improvement in the sensitivity, the surface of the magnet adjacent to which the teeth pass is provided with a thin layer of a magnetic material of high permeability. The magnetic sensing element advantageously is centered on this magnetic layer and is as described in USSN 289,634 or USSN 289,646.

Additionally, the width of the magnetic sensing element is desirably narrow for maximum sensitivity, but is wide enough to have a suitable resistance for good impedance matching with the electrical circuit used to detect the change in properties resulting from the magnetic flux being sensed. Preferably, any flux guide or field concentrator is avoided by using a magnet of adequate strength.

It is characteristic of this magnetic circuit that the passing teeth of the exciter essentially vary only the spatial distribution of the magnetic flux density along the width of the magnet for creating sharp local flux density variations that can be readily sensed by the sensing element, while the total flux density passing through the thin ferromagnetic layer remains essentially constant. By way of contrast, in prior art magnetic circuits, the passing teeth of the exciter vary the circuit reluctance and consequently vary the total magnetic flux in the circuit.

The invention will be better understood from the following more detailed description taken with the accompanying drawings and claims.

BRIEF DESCRIPTION OF THE DRAWINGS

In FIGS. 11B and 11C, the gate electrodes are electrically biased internally, by two different techniques.

FIG. 13 shows a typical magnetic circuit of a prior art position sensor of the type using a flux guide return path;

FIG. 14 shows the magnetic circuit of a position sensor in accordance with a preferred embodiment of the present invention.

FIG. 15 shows in more detail the stationary sensing portion of the magnetic circuit shown in FIG. 14.

The drawings are not to scale.

DETAILED DESCRIPTION

As indicated above, a new approach to making magnetoresistors is described and claimed in USSN 289,634 and USSN 289,646. It was found that if an accumulation layer is induced in the surface of an extremely thin film of low to moderate conductivity semiconductive material, the properties of the accumulation layer relevant to magnetic sensitivity can dominate over those of the remainder of the film.

Such accumulation layers can make higher band gap semiconductor materials, such as indium arsenide, useful in magnetosensors. Such materials can be used at higher operating temperatures than lower band gap semiconductive material, such as indium antimonide. However, it may even enhance the sensitivity of indium antimonide enough to allow it to be used at higher temperatures. In this discussion, the term accumulation layer is used. In this patent application, the term accumulation layer is intended to also include an inversion layer, unless otherwise noted.

The accumulation layer is especially directed to use in magnetoresistors made of higher band gap semiconductive materials. However, it is expected to be beneficial in magnetoresistors made of still other semiconductive materials.

Figure 1A:
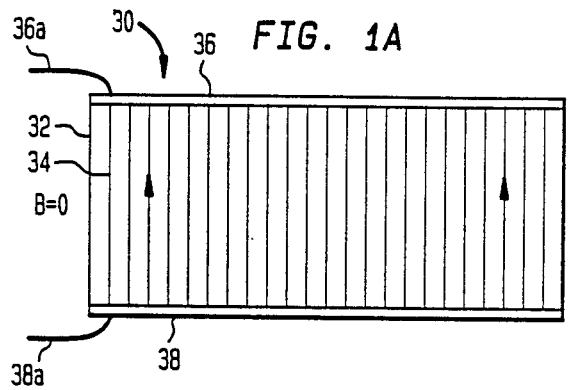
FIG. 1A is a schematic view of a magnetoresistor, showing its electrical current flow lines when no field is applied to it.

As shown in FIG. 1A, a typical magnetoresistor element 30 comprises a slab (substrate, body) 32 of semiconductor, typically rectangular in shape, through which a current is passed. Such a magnetoresistor is described by S. Kataoka in "Recent Development of Magnetoresistive Devices and Applications," *Circulars of Electrotechnical Laboratory*, No. 182, Agency of Industrial Science and Technology, Tokyo (Dec. 1974).

In the absence of magnetic field, the current lines 34 go from one injecting electrode 36 to another electrode 38 in parallel lines (see FIG. 1A). This flow is between electrodes 36 and 38 along the top and bottom edges of the rectangle in FIG. 1A. Bonding wires (contacts) 36a and 38a are connected to electrodes 36 and 38, respectively. The geometry (a rectangle in our example) is chosen so that an applied magnetic field, perpendicular to the slab 32, increases the current line trajectory (see FIG. 1B). The magnetic field perpendicular to the plane of the paper thus lengthens the current flow lines 34. As indicated by the denotation B=0, there is no magnetic field applied to slab 32 of FIG. 1A. The longer length leads to higher electrical resistance, so long as the resulting lateral voltage difference is electrically shorted, as shown, by the top and bottom edge electrodes 36 and 38.

Figure 1B:
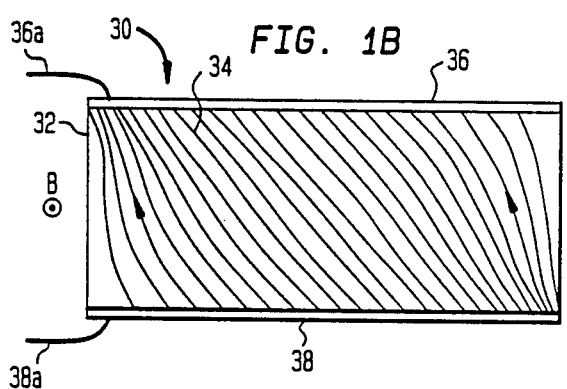
FIG. 1B a schematic view of a magnetoresistor, showing how the electrical current flow lines are redirected in the plane of its major surface when a magnetic field is applied perpendicular to that surface.

FIG. 1B shows how the electrical current flow lines 34 through slab 32 are redirected when a magnetic field B (shown with a circle having a dot in the center thereof) and coming out of the page is applied perpendicular to slab 32.

The best geometry for this effect to occur is one where the current injecting electrodes are along the longest side of the rectangle, and the ratio of this dimension ("width") to the shortest dimension ("length") is as large as possible. Preferably, the length of the shortest side is 10% to 60% the length of the longest side, and, more preferably, 20% to 40% the length of the longest side. Such an optimal device geometry hence leads to a very low resistance. Kataoka teaches that the magnetic field sensitivity of such devices is best when the devices are made out of semiconductors with as large a carrier mobility as possible. The resistivity of such devices is made less temperature-dependent when the semiconductor material contains a large donor concentration, giving a large carrier density. These last two constraints imply that semiconductors with high electrical conductivity are best suited for practical applications.

Figure 2:
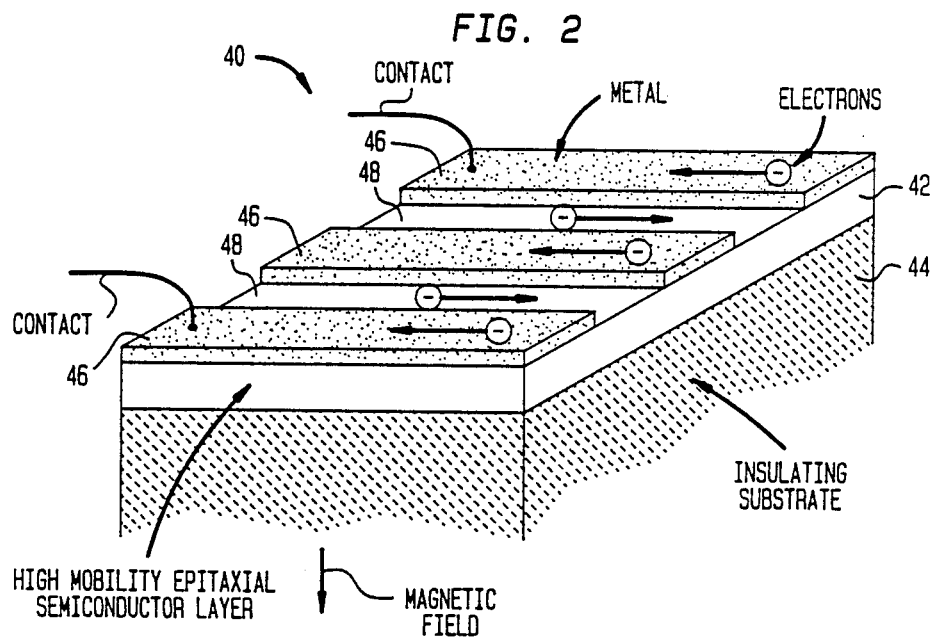
FIG. 2 is an isometric view showing a magnetoresistor having two integral sensing areas electrically in parallel.

Combined with the geometrical restrictions described earlier, one can deduce that the final magnetoresistor element will have a low resistance. This has a practical drawback. Under a constant voltage, the power dissipated by the device scales as the inverse of the resistance. To limit ohmic heating (which would limit the operational temperature range of the sensor, if not destroy the sensor itself) while maintaining a large voltage output during sensor interrogation, it is desirable that a magnetoresistive element have a resistance around 1,000 ohms. However, a resistance of about 300 ohms to about 6,000 ohms is acceptable in many applications. A number of ways have been proposed to achieve such resistances. For example, as Kataoka has pointed out, one can put a number of elementary devices in series. Making a plurality of sensing areas as integral parts of a single element is shown in FIG. 2, which shows a plurality of magnetoresistors 40 formed in an epitaxial layer 42 which is on an insulating substrate 44. Spaced-apart electrodes 46 are on a top surface of epitaxial layer 42. While only two sensing areas (i.e., devices) are shown, one could make an element with tens or hundreds of integral sensing areas (i.e., devices).

If the metal-semiconductor (magnetic-field independent) interfacial contact resistance of one such elementary device is an appreciable fraction of the semiconductor resistance of this elementary device, it will lower the sensitivity to a magnetic field. Thus, metals must be deposited which have a very low metal-semiconductor interfacial contact resistance to avoid this sensitivity degradation. In most cases, we would prefer that the interfacial contact resistance between the sensing area and its electrodes be 1014 100 times less than the resistance of the sensing area between those electrodes. Another option which alleviates the problem of low magnetoresistor device resistance has been to use active layers that are as thin as possible. This has been done by thinning wafers of indium antimonide (InSb), which were sliced from bulk ingots, down to thicknesses as small as 10 microns. The wafer thinning process is a very difficult process, since any residual damage from the thinning process will lower the electron mobility. Reducing electron mobility will decrease the sensitivity to a magnetic field of devices made from this material.

Another approach has been to deposit films of InSb onto an insulating substrate. On the other hand, in this latter case, the electron mobility of the resulting films is reduced to a fraction of that of bulk InSb. This reduction occurs because of defects in the film. With typical mobilities of 20,000 $cm^2V^{-1}sec^{-1}$, these films produce devices with greatly reduced sensitivity to a magnetic field compared to devices made from bulk InSb. As shown in FIG. 2, the usual magnetoresistors 40 made from a film includes an epitaxial layer 42 of the semiconductor material on the surface of an insulating substrate 44. Spaced-apart metal electrodes 46 are on the semiconductor layer 42 and extend thereacross to form rectangular active regions 48 of the semiconductor layer 42 therebetween. As shown, there are two active regions 48.

The great majority of the prior work until now has focused on InSb. This can be understood from the data in the following Table I.

TABLE I

Potential Magnetoresistor Materials at 300K

| Semiconductive Material | Maximum Electron Mobility ($cm^2V^{-1}sec^{-1}$) | Crystal Lattice Constant (A) | Energy Band Gap (eV) |
| --- | --- | --- | --- |
| InSb | 78,000 | 6.478 | 0.17 |
| $Bi_{1-x}Sb_x$ (x < 0.2) | 32,000 | 6.429(Bi) | 0–0.02 |
| InAs | 32,000 | 6.058 | 0.36 |
| $In_{0.53}Ga_{0.47}As$ (on InP) | 14,000 | 5.869 | 0.75 |
| GaAs | 8,000 | 5.654 | 1.4 |
| GaSb | 5,000 | 6.095 | 0.68 |
| InP | 4,500 | 5.869 | 1.27 |

For these III-V compounds, e.g., indium arsenide, the energy band gap decreases with increasing temperature.

Since the magnetoresistance effect is proportional to electron mobility squared for small magnetic fields, InSb is highly preferable. However, the difficulty of growing compound semiconductors in general, and the fact that there is no suitable, lattice-matched, insulating substrate upon which it may be grown, led us to try growing Bi films. Such work has been previously reported by Partin et al. in *Physical Reviews B*, 38, 3818–3824 (1988) and by Heremans et al. in *Physical Reviews B*, 38, 10280–10284 (1988). Success was obtained in growing epitaxial Bi thin films, with mobilities as high as 25,000 $cm^2V^{-1}sec^{-1}$ at 300 K and 27,000 $cm^2V^{-1}sec^{-1}$ for $Bi_{1-x}Sb_x$ at 300K. Magnetoresistors made from these films had very low sensitivities. Modeling studies which we have just completed indicate that this is, to our knowledge, an unrecognized effect of the fact that the energy band structure of Bi has several degenerate conduction band minima. Other high mobility materials shown in Table I have a single, non-degenerate conduction band minimum. InSb thin films (on semi-insulating GaAs substrates) were then grown using the metal organic chemical vapor deposition (MOCVD) growth techniques. After many months of effort, films with electron mobilities of only 5,000 $cm^2V^{-1}sec^{-1}$ were produced.

However, we have found that good magnetoresistors can be formed of thin films of a semiconductor material having a band gap of at least 0.36 electron volt, such as indium arsenide (InAs), on a semi-insulating substrate. By "semi-insulating," it is meant that the substrate is of such a high resistivity as to be substantially insulating. Preferably, the semiconductor film should be of a thickness less than about 3 micrometers, although films of a thickness of about 5 micrometers will form satisfactory magnetoresistors. The film should have an accumulation layer along its surface with the areal electron density of the surface accumulation layer being substantially greater than the areal electron density of the bulk of the film. The bulk electron density of the film is at most moderate, and is generally in the order of $10^{16}$ electrons per cubic centimeter or lower. The film preferably should be of a good crystalline quality having a high average electron mobility, 10,000 to 32,000 square centimeters per volt per second.

Growth of indium arsenide (InAs) on semi-insulating GaAs, and also on semi-insulating InP substrates, was tried. These latter substrates were made semi-insulating by doping them with Fe. They were tried in addition to GaAs because there is less lattice mismatch with InAs (see Table I). After some time, we were able to produce InAs films with a room temperature mobility of 13,000 $cm^2V^{-1}Sec^{-1}$ on InP substrates, and of lower mobility on GaAs substrates. The better InAs films were formed by the following process.

An MOCVD reactor manufactured by Emcore Corporation was used. InP substrates were heated to the growth temperature in an atmosphere of 40 torr of high purity (palladium diffused) hydrogen to which a moderate quantity of arsine was added (80 SCCM, or standard cubic centimeters per minute). This produced about 0.02 mole fraction of arsine. The arsine was used to retard thermal decomposition of the InP surface caused by loss of the more volatile phosphorus. The way in which arsine reduces the surface roughening during this process is not well understood. Phosphine would have been preferred, but was not available at the time in our reactor. After reaching a temperature of 600° C., the arsine flow was reduced to 7 SCCM, and ethyl-dimethyl indium (EDMIn) was introduced to the growth chamber by bubbling high purity hydrogen (100 SCCM) through EDMIn which was held at 40° C. Higher or lower arsine flows during growth gave lower mobilities and worse surface morphologies. After 2.5 hours of InAs growth time, the EDMIn flow to the growth chamber was stopped and the samples were cooled to room temperature in an arsine-rich atmosphere (as during heat-up).

The thickness of the resulting InAs film was 2.3 micrometers. From conventional Hall effect measurements at 300 K, the electron density was $1.4 \times 10^{16}$ cm$^{-3}$ and the electron mobility was 13,000 cm$^2$V$^{-1}$sec$^{-1}$. These are effectively averages since the electron density and mobility may vary within a film. The film was not intentionally doped. Even though this is a very disappointing mobility, a crude magnetoresistor was made, since this required very little effort. A rectangular sample was cleaved from the growth and In metal was hand-soldered along two opposing edges of the sample, and leads were connected to the In. The length, which is the vertical dimension in FIGS. 1A and 1B, was 2 mm, and the width, which was the horizontal dimension in FIGS. 1A and 1B, was 5 mm.

Figure 3:
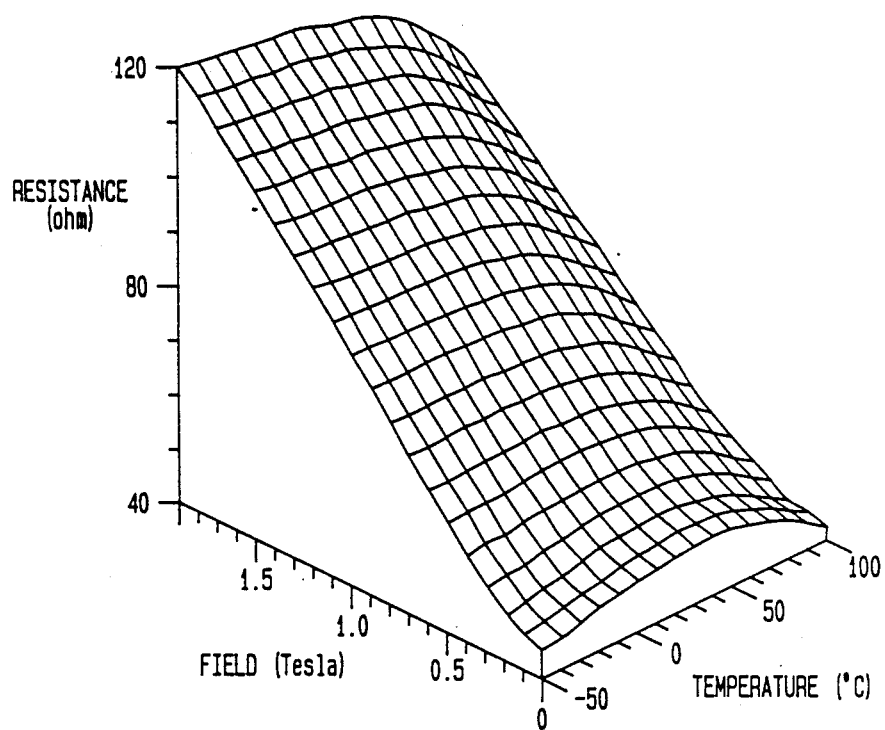
FIG. 3 is a three-dimensional or contour plot showing the change of electrical resistance in a single element larger band gap semiconductor magnetoresistor with changes in temperature and magnetic field strength.

FIG. 3 graphically shows a three-dimensional or contour plot showing the change of electrical resistance in a single element larger band gap semiconductor magnetoresistor with changes in temperature and magnetic field strength.

Figure 4:
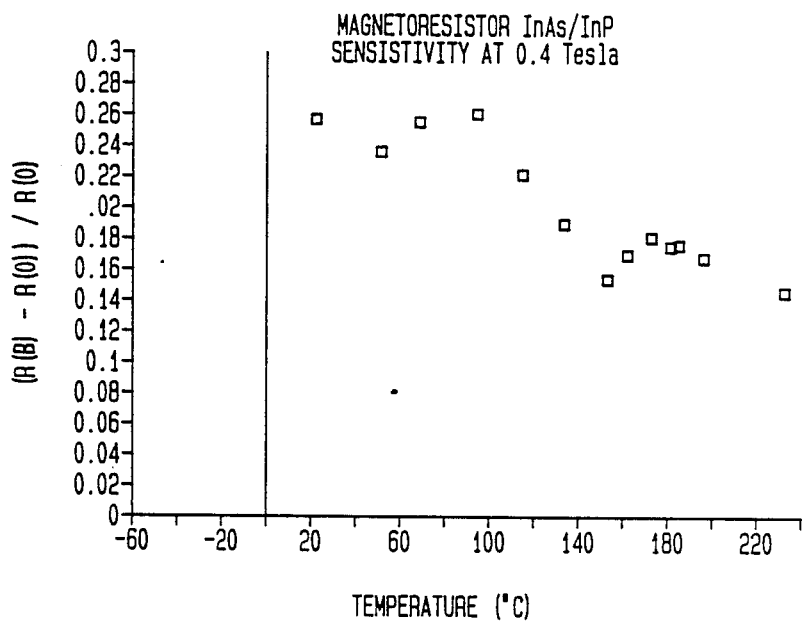
FIG. 4 is a two-dimensional plot of the fractional magnetoresistance over a wider temperature range than shown in FIG. 3.
Figure 5:
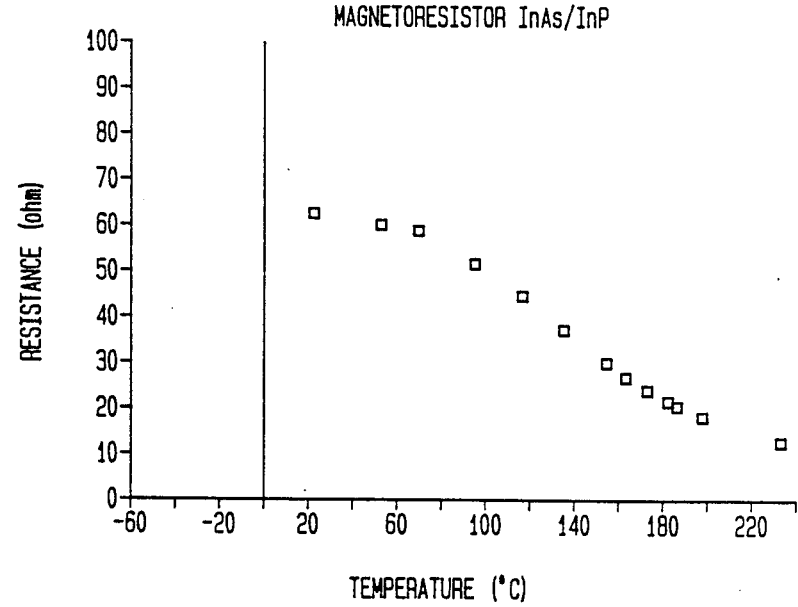
FIG. 5 is a two-dimensional plot showing change in resistance with no magnetic field applied over a wider temperature range than shown in FIG. 3.

As expected, the resistance of the device was low (about 50 ohms) since we did not have many elements in series. However, the magnetoresistance effect was large. It is shown in FIG. 3. Furthermore, the device resistance and magnetoresistance were surprisingly stable with temperatures in the range shown in FIG. 3, which is −50° C. to +100° C. A second, similar device was tested less thoroughly at temperatures as high as +230° C. FIG. 4 graphically shows a two-dimensional plot of the fractional magnetoresistance over a wider temperature range than shown in FIG. 3. FIG. 5 is a two-dimensional plot showing change in resistance with no magnetic field applied over a wider temperature range than shown in FIG. 3. The results of this latter testing are shown in FIGS. 4 and 5. In FIG. 4, the applied magnetic field was 0.4 Tesla. The fractional magnetoresistance is plotted as a function of temperature between B =0.4 Tesla and B =0. Despite the fact that the indium metal used for contacts has a melting point of 156° C., the magnetoresistor still functioned very surprisingly well at 230° C., with the fractional increase in resistance for a given magnetic field (0.4 Tesla) reduced by less than one-half compared to the response near room temperature (as shown in FIG. 4).

The device resistance in zero magnetic field, R(0), decreased over the same temperature range by a factor of 5 (as shown in FIG. 5). We also found this to be surprisingly good, even taking into account the relatively large energy gap of InAs.

Our own detailed analysis of transport data from these films suggests that there are current carriers with two different mobilities present. In retrospect, it looks like our results are related to an accumulation layer of electrons at the surface of the sensing layer. We have now recognized that Wieder has reported in *Appl. Phys. Letters*, 25, 206 (1974) that such an accumulation layer exists just inside the InAs near the air/InAs interface. There appear to us to be some errors in the Weider report. However, we think that the basic conclusion that an electron accumulation layer exists is correct.

These electrons are spatially separated from the positive charge at the air/InAs interface. Thus, they are scattered relatively little by this charge, resulting in a higher mobility than would normally be the case. They also exist in a very high density in such an accumulation layer, so that as the temperature increases, the density of thermally generated carriers is a relatively small fraction of the density in the accumulation layer. This helps stabilize the resistance (at zero magnetic field) with temperature. Thus, it appears that the relatively low measured electron mobility of 13,000 cm$^2$V$^{-1}$sec$^{-1}$ is an average for electrons in the accumulation layer and for those in the remainder of the thickness of the film.

Thus, normally one would want to grow a relatively thick layer of InAs to make a good magnetoresistor, since crystal quality (and mobility) generally improve with thickness when growing on a lattice-mismatched substrate. However, the thicker the layer becomes, the greater its conductivity becomes and the less apparent the benefits or presence of a surface accumulation layer would be. Thus, our current understanding of our devices suggests that relatively thinner layers are preferable, even if the average film mobility decreases somewhat, since this will make the conductivity of the surface accumulation layer a greater fraction of the total film conductivity. The exact relationships between film thickness, crystal quality and properties of the surface accumulation layer are currently under study.

Figure 6:
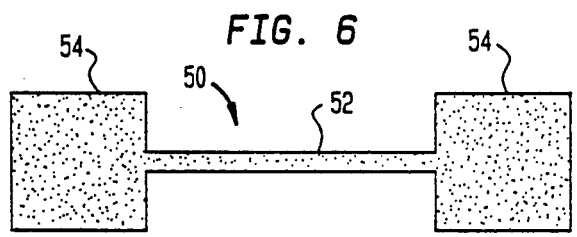
FIG 6 is an elevational view showing a semiconductor film in a pattern for providing a series connected plurality of sensing areas integrated in a single magnetoresistor.
Figure 7A:
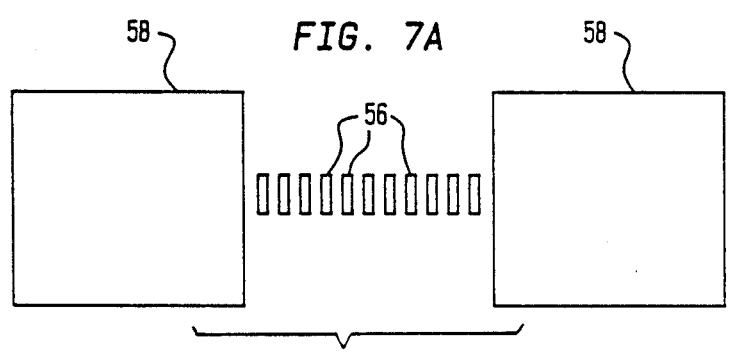
FIG. 7A is an elevational view showing a metallization pattern for superposition on the pattern of FIG. 6.
Figure 7B:
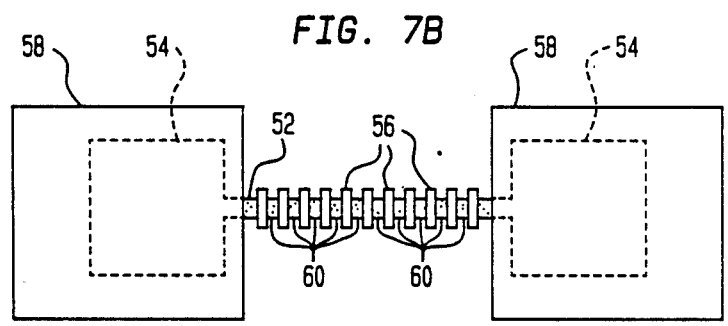
FIG. 7B is an elevational view showing the metallization pattern of FIG. 7A superimposed on the pattern of FIG. 6 to delineate the plurality of sensing areas.

Multi-element magnetoresistors were subsequently made from this material using Au (or Sn) metallization. First, conventional photolithography techniques were used to etch away unwanted areas of an indium arsenide (InAs) film from the surface of the indium phosphide (InP) substrate to delineate the pattern shown in FIG. 6. The delineated film 50 is in the form of a dumbbell having an elongated portion 52 with enlarged portions 54 at each end thereof. A dilute solution (0.5%) of bromine in methanol was used to etch the InAs. Then, a blanket layer of Au metallization 1000 Angstroms thick was deposited using conventional vacuum evaporation techniques over the entire surface of the sample, after removing the photoresist. Conventional photolithography was then used to etch away unwanted areas of the Au film to delineate the gold pattern shown in FIG. 7A. The gold pattern includes a plurality of small, spaced electrode 56 arranged in a row and a large electrode 58 at each end of the row of small electrodes 56. A dilute aqueous solution of KCN was used for this step. We think dissolved oxygen is helpful. It can diffuse into the solution from ambient air or be supplied in the form of a very small addition of hydrogen peroxide. The resultant composite of the two patterns, with the gold pattern overlying the InAs film pattern, is shown in FIG. 7B where the electrodes 56 extend across the elongated portion 52 and the large electrodes 58 cover the enlarged portions 54 of the film 50. The electrodes 56 delineate the elongated portion into active regions 60 and the large electrodes 58 serve as bonding pads.

Figure 8:
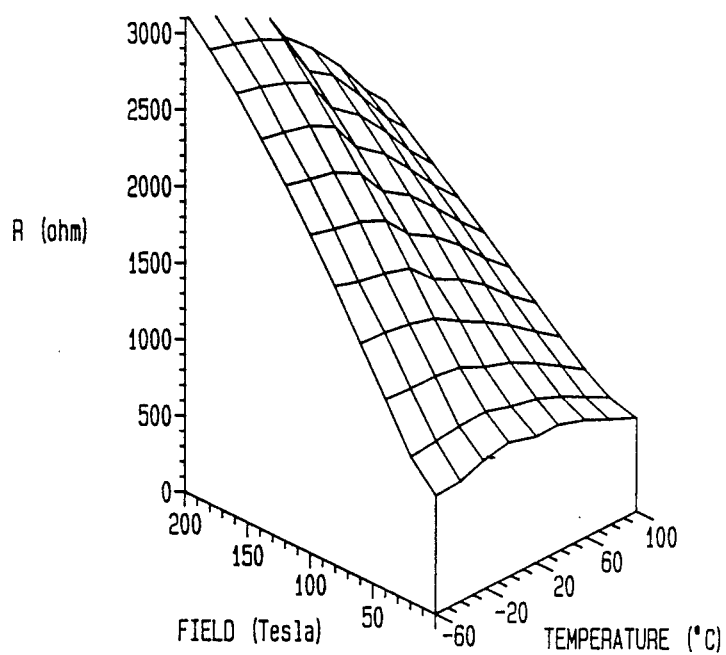
FIG. 8 is a three-dimensional or contour plot showing the change of electrical resistance of a multiple sensing area magnetoresistor such as shown in FIG. 7B.

Leads (not shown) were then attached by silver epoxy to the large Au end bonding pads 58. Leads could also be attached by normal and accepted filamentary wire bonding techniques. If so, and especially if a modern wire bonding apparatus were used, the bonding pads could easily be made much smaller. Also, many devices such as shown in FIGS. 6, 7A and 7B could be made simultaneously using conventional integrated circuit technology. The resulting devices typically have a resistance near 1,000 ohms (typically + or − 20%) at room temperature in zero magnetic field. Surprisingly, the magnetoresistance effect on the multisensing area device was much larger than the effect on a single sensing area device. FIG. 8 graphically shows a three-dimensional or contour plot showing the change of electrical resistance of a multiple sensing area magnetoresistor such as shown in FIG. 7B. For comparison, of these effects at a given magnetic field, see FIGS. 8 and 3. In the multi-element device (i.e., plural sensing area element), the sensing areas had a length-to-width ratio of 2/5. We do not understand why the multi-element device works better since the length-to-width ratio of each element is 2/5, the same as for the single element device characterized in FIG. 3, which was fabricated using part of the same InAs grown layer. Another multi-element magnetoresistor was made similarly to the one just described, but with a length-to-width ratio of 4/5. It had nearly as large a magnetoresistance as the one made according to the patterns in FIGS. 4 and 5. Again, we do not yet understand this, but the resulting devices work very well. Even a device with a length-to-width ratio of 6/5 works well.

The relative stability of these magnetoresistors with temperature also now appears to be increasingly important, since some automotive applications require operation from −50° C. to as high as +170° C. to +200° C., and there are known applications requiring even higher temperatures (to 300° C.). There is reason to believe that our invention will provide magnetoresistors operating at temperatures as high as 300° C., and even higher.

A potential problem with InAs magnetoresistors made in accordance with this invention is the potential importance of the air/InAs interface, which might cause the device characteristics to be sensitive to changes in the composition of ambient air, or cause the characteristics to slowly change with time or thermal history because of continued oxidation of the surface. Coating the surfaces of two devices with a particular epoxy made by Emerson and Cuming, a division of Grace Co., has been tried. The epoxy used was "Stycast," number 1267. Parts A and B were mixed, applied to the devices, and cured at 70° C. for two hours. We did not observe any significant changes in the device characteristics at room temperature as a result of this encapsulation process. We have not yet systematically tested these devices at other temperatures, but we are encouraged by this preliminary result. We think other forms of encapsulants need to be explored, such as other epoxies and thin film dielectrics, such as $SiO_2$ or $Si_3N_4$. Since exactly what occurs at the air/InAs interface which causes the accumulation layer is not yet known, intended for exploration is the depositing of a thin film of dielectric or high energy gap semiconductor (such as GaAs, $In_{1-x}Ga_xAs$, $In_{1-x}Al_xAs$, or AlSb) right after growth of the InAs is complete, and before exposure to air. We hope that this will still result in an accumulation layer at the interface between InAs and the dielectric or high energy gap semiconductor.

In order to still have a very low metal-semiconductor contact resistance between the InAs and the contact and shorting bar metallization, it may be necessary to modify the processing sequence previously described in connection with FIGS. 6, 7A and 7B. For example, with an inverse of the mask contemplated in the previous discussion, the photoresist on the surface could then be used as a mask for wet etching (e.g., by wet chemicals or reactive ions, or ion beams) of the dielectric or high energy gap semiconductor layer to expose the InAs. Au or other metals could then be deposited by vacuum evaporation (or by other conventional processes, such as sputtering, electroplating, etc.) and then the photoresist could be removed, resulting in lift-off of the undesired regions of metal. Alternatively, after etching through to the InAs, the photoresist could be removed. Au or other metal could then be deposited uniformly across the surface, and, after deposition of photoresist, the mask pattern in FIG. 7A could be aligned with the pattern etched into the dielectric. Then, the Au could be patterned as before.

As an additional alternative, if a sufficiently thin layer (e.g., 200 Angstroms) of high energy gap semiconductor is present, the original processing sequence described could be modified by deposition of a low melting temperature eutectic alloy, such as Au-Ge, Au-Ge-Ni, Ag-Sn, etc., in place of Au. After patterning similarly to the way Au was (or using the inverse of the mask in FIG. 7A and lift-off), the sample is heated to a moderate temperature, typically to somewhere in the range of 360° C. to 500° C. for Au-Ge based alloys, thus allowing the liquid metal to locally dissolve the thin layer of high energy gap semiconductor, effectively contacting the InAs.

In most recent work, the InAs growth procedures are changed somewhat. The procedures are the same as before, but the InP wafer is heated to 460° C. in a larger arsine mole fraction (0.1). After 0.5 minutes at 460° C., during which the native oxide on InP is believed to desorb, the temperature is lowered to 400° C. and 200 Angstroms of InAs thickness is grown. The temperature is then raised to the growth temperature of 625° C. (with the arsine mole fraction still 0.1), and then EDMIn is introduced while the arsine flow is abruptly reduced to 5 SCCM (about 0.001 mole fraction). The EDMIn is kept at 50° C., and the high purity hydrogen is bubbling through it at a rate of 75 SCCM. Again, the arsine flow of 5 SCCM seems near-optimal for these growth conditions. The resulting films have somewhat enhanced sensitivity to a magnetic field relative to those grown earlier.

While all of our initial work concentrated on magnetoresistors fabricated from InAs films of low to moderate conductivity and reasonable mobility on semi-insulating (i.e., substantially electrically insulating) InP substrates, we think that a more mature growth capability will permit films of InAs with nearly comparable quality to be grown on semi-insulating GaAs substrates as well. In either case, other growth techniques, such as molecular beam epitaxy liquid phase epitaxy or chloride-transport vapor phase epitaxy, may also prove useful.

We are describing and claiming the above-mentioned indium arsenide (InAs) thin film devices, fabrication processes, and operating characteristics in a separate U.S. patent application Ser. No. 289,634 entitled, "Indium Arsenide Magnetoresistor," that was filed on Dec. 23, 1988 in the names of J. P. Heremans and D. L. Partin. A continuation-in-part of United States patent application Ser. No. 289,634 is being filed concurrently with this patent application.

On the other hand, we think that the presence of what may be a naturally occurring accumulation layer in the above-mentioned thin film InAs magnetoresistors is what makes them work so well, and which enabled production of a practical device. We believe that this fundamental concept is new to magnetoresistors, and that this thought can be expanded in a multiplicity of ways, not only with indium arsenide, but to other semiconductive materials as well. In U.S. patent application Ser. No. 289,646, we further describe and claim a variety of techniques by which an accumulation layer can be artificially induced or enhanced in the semiconductor layer, e.g., by other than a natural occurrence or inherent occurrence as a result of the fabrication process. A continuation-in-part of U.S. patent application Ser. No. 289,646 is being filed concurrently with this patent application.

The following discussion describes some of the artificial ways of inducing or enhancing an electron accumulation or inversion layer in low to moderate conductivity InAs thin films and in other semiconductive materials in such thin film form, to attain effective high mobilities. There are three basic advantages to the use of strong electron accumulation layers in magnetoresistor active regions. It is repeated here that the term electron accumulation layer, as used in this patent application, is also intended to include electron inversion layers.

First, electron accumulation layers or strong electron inversion layers can contain a density of electrons significantly larger than the intrinsic density at any given temperature. This must improve the temperature stability, since the thermally excited carriers are a small fraction of the accumulated or strongly inverted ones.

Second, accumulation layers enhance the mobility of the carriers in the semiconductor. This effect has been experimentally observed in thin indium arsenide (InAs) films, especially at higher temperatures. They will enhance the sensitivity of the magnetoresistor. One possible cause of this effect may be that in such accumulated or strongly inverted layers, large electron densities can be achieved without the presence of a large density of ionized impurities in the same spatial region, which would limit the carrier mobility. This effect is similar to the "modulation doping" of layers described by G. Burns in *Solid State Physics*, pp. 726-747, Academic Press (1985). Such an effect is used in the fabrication of High-Electron-Mobility-Transistors (HEMTs).

Third, accumulation or strong inversion layers are inherently close to the surface or interface of a semiconductor. This makes it relatively easy to induce, enhance, or control these accumulation or strong inversion layers through the use of thin film structures deposited on top of the semiconductor, possibly in combination with voltage biases.

Accumulation layers have been used in silicon MOSFET Hall plates, and is described by H. P. Baltes et al. in *Proc. IEEE*, 74, pp. 1107-1132, especially pp. 1116-7, (1986). In the MOSFET Hall effect devices, a biased gate electrode in a Metal-Oxide-Semiconductor was used to generate a suitably thin electron layer close to the Semiconductor-Oxide interface. Four electrodes were then used to contact that layer: a source and a drain through which current is passed, and two intermediate electrodes across which the Hall voltage is generated. Further, Baltes et al, ibid., also describe a split-drain MOSFET using an accumulation-layer based sensor with only four electrodes (one source, two drains, and one gate). One of the virtues of a magnetoresistor over a Hall effect device is that the magnetoresistor has only two electrodes. In order to preserve this in our improved magnetoresistor concept, we propose to use, in conjunction with a magnetoresistor layout such as described in FIG. 2, a number of new ways to generate accumulation or inversion layers without using externally biased gate electrodes.

In a first embodiment, we make use of the fact that the natural interface between InAs and air is known to generate an electron accumulation layer in InAs. A similar effect may exist in InSb, and the technique may, therefore, be applicable to thin film magnetoresistors made with this semiconductor material. We would, however, not expect such devices to work as well as InAs at very high temperatures. The very small energy gap of InSb (see Table I) would cause thermal generation of carriers that would cause increased conductivity in the InSb film adjacent to the accumulation layer, making the conductivity of the accumulation layer a relatively small fraction of the total device conductivity. Thus, the benefits of an accumulation layer would be lost at a lower temperature in InSb than in the higher energy band gap InAs. We experimentally grew a 2.3 micrometers thick epitaxial layer of InAs on an insulating InP substrate using Metal Organic Chemical Vapor Deposition (MOCVD). Hall and magnetoresistance measurements on the layer in the temperature range of 350K to 0.5K, and in magnetic fields up to 7 Tesla, reveal the presence of at least two "types" of carriers, in roughly equal concentrations, but with very different mobilities (by a factor of 2 to 3). In retrospective view of the aforementioned Weider publication, it is reasonable to assume that one of them is the accumulation layer located near the air interface. We built two 2 mm long, 5 mm wide magnetoresistors out of this film which develop a very usable magnetic field sensitivity, while maintaining good temperature stability. We believe it is possible to preserve this sensitivity after covering the InAs surface with a suitable encapsulating coating (e.g., an epoxy or other dielectric).

In a second embodiment, a capping layer of large-gap semiconductor such as GaAs, InP, AlSb, or $In_{1-y}Al_yAs$ can be grown on top of the narrow-gap active layer semiconductor (typically InAs or $In_{1-x}Ga_xAs$ with $0 > x > 0.5$, although a similar structure using InSb can be conceived). In this capping layer, we put donor-type impurities, such as Si, Te, Se, or S These will release an electron, which will end up in the layer where it has minimum energy, i.e., the narrow-gap semiconductor. This leaves a layer of positively ionized donor-impurities in the large-gap capping layer; but they are spatially removed from the electrons in the active layer, and hence do not significantly scatter them.

Figure 9:
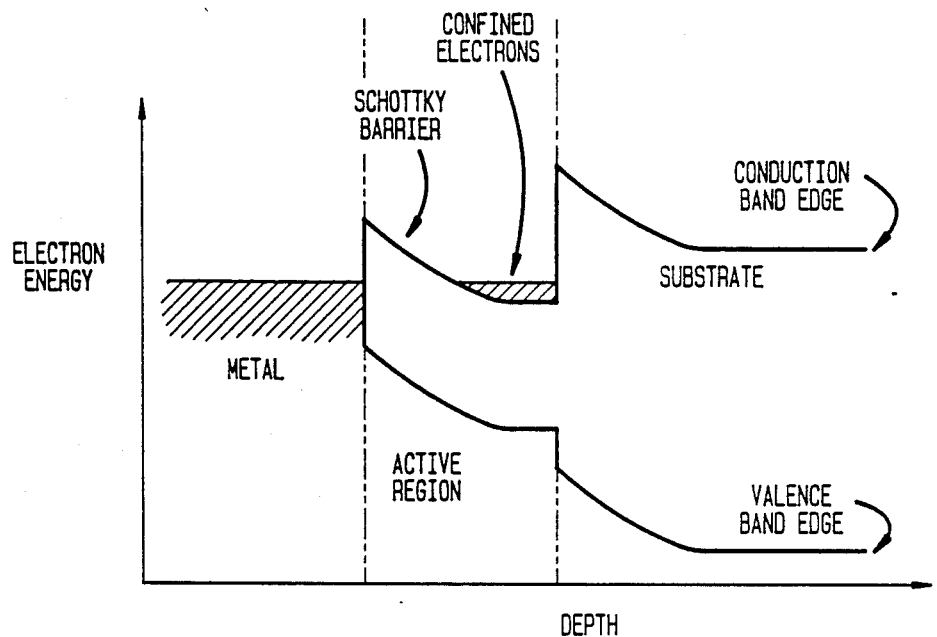
FIGS. 9 and 10 are two-dimensional electron energy-to-depth plots showing how electrons could be confined in an accumulation layer under special layers on the surface of the sensing area of the magnetoresistor.

In a third embodiment, we propose to deposit a layer of metal on top of the device active region with the purpose of creating a Schottky barrier. A plot of the electron energy levels adjacent the metal-semiconductor interface versus depth in this third embodiment is shown in FIG. 9. In referring to FIG. 9, it can be seen that there will be a depletion of the top region of the active narrow-gap semiconductor. If the active layer is thin enough (1000-2000 Angstroms), this will confine electrons in the active layer towards the substrate, resulting in electrical properties similar to those of an accumulation layer. Metals that generally form Schottky barriers to III-V compounds, such as Au or Al, may be useful, although we have not adequately studied this structure experimentally yet.

Figure 10:
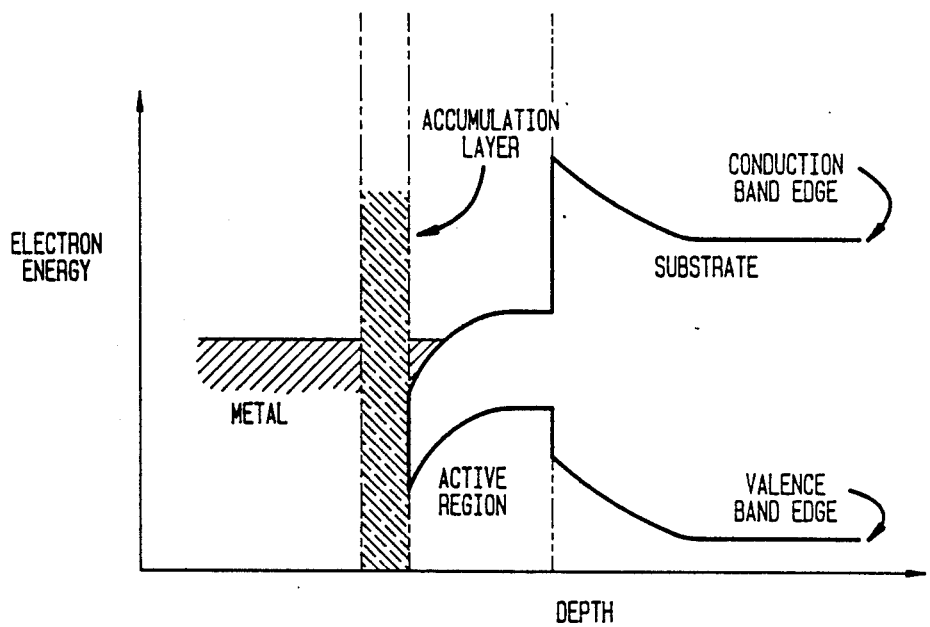
Figure 11A:
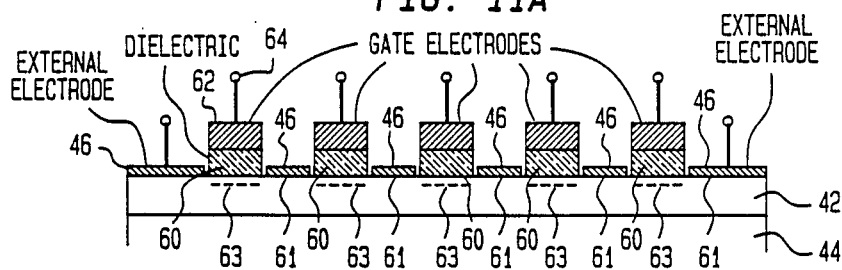
FIGS. 11A, 11B, and 11C are schematic views showing a magnetoresistor having a gate electrode over each of a plurality of sensing areas to electrically induce an accumulation layer in each sensing area.

Referring now to FIG. 11A, there is shown a fourth embodiment which shows a cross-sectional view of a plurality of magnetoresistors 59 in accordance with the invention. Magnetoresistors 59 are formed in an epitaxial layer 42 which is on a substrate 44. Spaced-apart electrodes 46 are on a top surface 61 to layer 42. Substrate 44, layer 42 and electrodes 46 are essentially the same as the corresponding components of FIG. 2, which have the same reference numbers. Spaced apart from and between adjacent electrodes 46 are gate electrodes 62 which are each separated from surface 61 by a large gap semiconductor layer or a dielectric layer 60 which is typically $SiO_2$ or $Si_3N_4$. FIG. 10 graphically shows a plot of electron energy versus depth through the relevant interfaces of magnetoresistors 59 of FIG. 11A. A separate one of a plurality of electrical conductors 64 is shown connected to each gate electrode 62. Gate electrodes 62 are typically formed of a metal which can be selected such that it induces an accumulation region (inversion region or layer) 63 (shown as a dashed line in layer 42) under each gate electrode 62. Conversely, gate electrode 62 can have a different metal with a larger work function to deplete the semiconductor dielectric interface and electrostatically confine the electrons near the substrate 44, much as in the third embodiment described hereinabove. The gate electrodes 62 can have voltages applied to same through conductors 64 so as to generate accumulation layers 63 in layer 42. This is typically not a preferred method of operation because it eliminates the simple two contact aspects of a typical magnetoresistor.

Figure 11B:
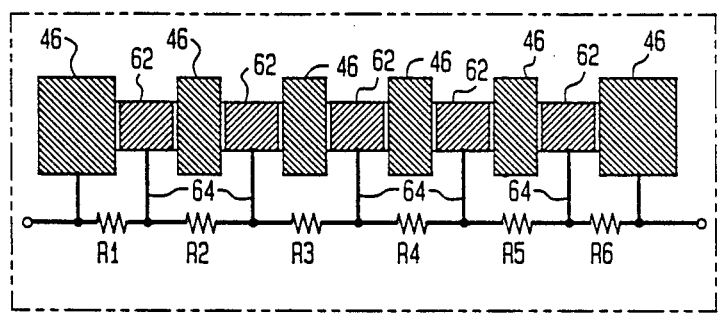

Referring now to FIG. 11B, there is shown a top view of the magnetoresistor 59 of FIG. 11A which has been modified to allow two external contact operations while applying bias voltage to each gate electrode 62 through contacts 64 connected to a series resistor circuit comprising resistors R1, R2, R3, R4, R5 and R6. Since currents drawn into gate electrodes 62 are very small due to the very high ($<10^6$ ohms) input impedance of circuit 59 looking into the gate electrodes 62, the resistors R1 to R6 can have large resistive values. In some applications, resistor R1 can be made very large (essentially an open circuit) and resistors R2, R3, R4, R5 and R6 can be made very small (essentially short circuits). Thus, a full positive bias voltage applied to the electrode 46 on the left in FIG. 11B relative to the electrode 46 on the right is applied to all of the gate electrodes 62.

Figure 11C:
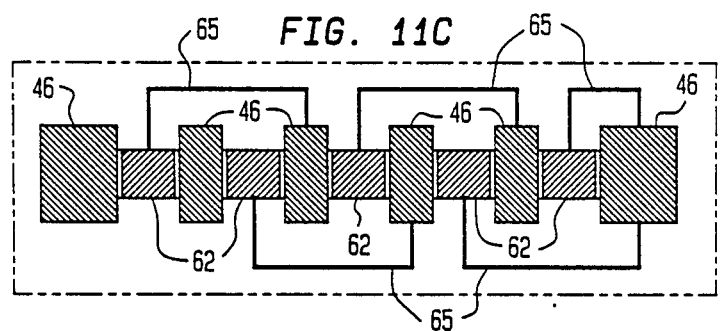

Referring now to FIG. 11C, there is shown a top view of the magnetoresistors 59 of FIG. 11A which has been modified to allow two external contact operations via the use of shorting bars (wires, conductors) 65 between electrodes 46 and gate electrodes 62 to generate accumulation regions under the gate electrodes 62. The magnetoresistors of FIG. 11C can be modified such that each electrode 46 is shorted (electrically connected) to an adjacent contact 62. In this configuration, each of the magnetoresistors might be considered a MISFET transistor with the gate and drain shorted together.

In the five preceding embodiments, the accumulation layers were used only to enhance the desirable transport properties of the semiconductor in the sensing area (i.e., the regions of layer 42 under gate electrodes 64). The geometry of the magnetoresistor, i.e., the length-over-width ratio of each active element, was still defined by the use of metallic shorting bars. The structure of FIG. 11A can be extended to define the geometry of the magnetoresistors themselves, by modulating the carrier density, and hence the conductivity, inside the semiconductor active layer 42. This forms a sixth embodiment of this invention.

Figure 12:
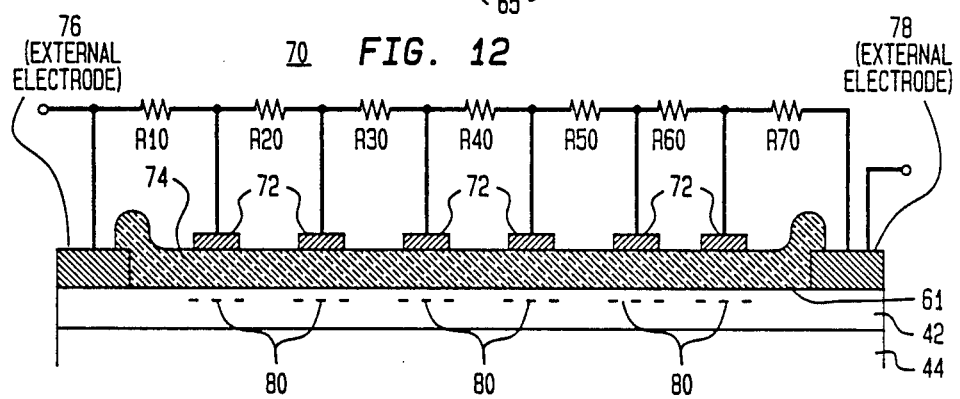
FIG. 12 is a schematic view showing a magnetoresistor having accumulation layers not only in the sensing areas, but also as conductors making electrical contact to the edges of the sensing areas.

Referring now to FIG. 12, there is shown in schematic and cross-sectional form one example of the sixth embodiment of the invention which comprises a magnetoresistor-resistor biasing circuit 70. Circuit 70 comprises a semiconductor substrate 44 on which is formed an epitaxial layer 42, a plurality of spaced-apart electrodes 72 separated from a top surface 61 of layer 42 by a dielectric layer 74, external electrodes 76 and 78 on surface 61 and electrodes 72 which are separated from each other by portions of dielectric layer 74, and a series resistance circuit comprising resistors R10, R20, R30, R40, R50, R60 and R70. Though not shown, the resistors R10–R70 are typically formed in a portion of epitaxial layer 42 or on substrate 44.

A common terminal between adjacent resistors (e.g., the common terminal of resistors R10 and R20) is coupled to a separate one of electrodes 72. A non-common terminal of resistor R10 is coupled to external electrode 70 and a non-common terminal of resistor R70 is coupled to external electrode 78.

With a voltage difference established between external electrodes 76 and 78, the electrodes 72 are biased such that strong accumulation regions (shown as dashed lines) 80 are formed within portions of layer 42 which are under electrodes 72. These strong accumulation regions essentially act in the same way as electrodes 46 of FIG. 11A and thus define the geometry of the magnetoresistors formed in layer 42. These accumulation regions 80 can be used instead of metallic shorting bars to create geometrical magnetoresistance. Such a structure could potentially be superior to one in which metallic shorting bars (electrodes) are used, because field-insensitive contact resistances between the metal and the semiconductor would be eliminated.

Circuit 70 can be modified such that the resistor R10 is open-circuited (i.e., a very high impedance) and the other resistors (R20–R70) are short circuited (very low impedances) so that essentially all of the positive bias applied to one external electrode 70 is also applied to each electrode 72. Thus, the natural accumulation layer normally present on an InAs surface would exist between the electrodes 72 as exists under gate electrodes 62 of circuit 59 of FIG. 11A, but have a lower electron density. If desired, the electrodes 72 could be biased negatively to eliminate the electron accumulation layers between the electrodes 72, or even to generate a strong inversion layer with carriers of the opposite type (holes). While the emphasis of this record of invention is on devices with only two external leads, the gates could be connected through a resistor network to a third external lead, making this version of the magnetic field sensor externally controllable through a voltage bias externally supplied. As hereinbefore indicated, a similar three-terminal device could be made with the device shown in FIG. 11A.

In a seventh embodiment, a lightly p-type film is grown (typically doped with Zn, Cd, Mg, Be, or C). In the case of InAs, the surface would, we believe, still have a strongly degenerate electron layer, but it would be an inversion layer. Such an inversion layer would have a large electron density near the surface, and then a relatively thick (typically about 0.1 micrometer to 1 micrometer or more, depending on dopant density) region of very low carrier density, similar to the space charge region of an n+/p junction. This might be advantageously used to reduce the conductivity of the film adjacent to the electron strong inversion layer. At very high device operating temperatures, the intrinsic carrier density of narrow energy gap semiconductors like InAs would tend to defeat this strategy somewhat, and other, higher energy gap semiconductors such as $In_{1-x}Ga_xAs$ might be preferred (see Table I). $In_{0.5}$-

$In_{0.53}Ga_{0.47}As$ is a special case, since it can be lattice-matched to semi-insulating InP substrates. This makes it easier to grow such films with high crystalline quality.

The acceptor dopants mentioned above (i.e., Zn, Cd, Mg, Be, and C) have small activation energies in the III-V compounds of interest (see Table I). However, there are other acceptor dopants with relatively large activation energies, such as Fe, in $In_{0.53}Ga_{0.47}As$. This means that relatively large thermal energy is required to make the iron ionize and contribute a hole to conduction. However, the iron will compensate a concentration of donor impurities frequently present in the material so that they do not contribute electrons to the conduction band. Thus, doping this material with iron will make it tend to have a high resistivity, except in the electron-rich accumulation layer. It would in this case be desirable to grow a thin undoped $In_{0.53}Ga_{0.47}As$ layer (e.g., 0.1 micrometer thick, after correcting for iron diffusion effects) on top of the iron doped layer in order to obtain the highest possible electron mobility and density in the accumulation layer. It is recognized, however, that finding suitable dopants with large activation energies may not be practical for smaller band gap semiconductive materials. Furthermore, the other embodiments discussed above could also be used in conjunction with this one advantageously to reduce the conductivity of the film adjacent to the high electron density region.

The emphasis of the above discussion has been on electron accumulation or inversion layers. Hole accumulation or inversion layers could also be used. However, electrons are usually preferred as current carriers in magnetoresistors since they have higher mobilities in the materials shown in Table I.

We think that these types of magnetoresistors are especially attractive for automotive applications, as part of a linear or rotary measurement system. Naturally occurring accumulation layers in indium arsenide, and artificially induced or enhanced accumulation layers in indium arsenide would be especially useful in the type of magnetic circuit described in United States patent application Ser. No. 229,396, filed 8 Aug. 1988, in the names of Thaddeus Schroeder and Bruno Lequesne and entitled, "Position Sensor." An accumulation layer in many compound semiconductor materials may not produce sensors having high magnetic sensitivity to be preferred for use at low temperatures. However, their magnetic sensitivity extend up to higher temperatures, where normally higher magnetic sensitivity materials are not useful. However, it is believed that the Schroeder and Lequesne type of magnetic circuit is so effective in concentrating magnetic field, that the lesser sensitive magnetoresistors may still work well enough to be useful. The temperature at which an accumulation layer no longer will provide a magnetic sensitivity enhancement varies from material to material. It varies because the band gap of each material will determine the temperature at which thermally generated carriers in the bulk of the film will dominate conductivity over carriers in the accumulation layer. When they do, they will mask the magnetic sensitivity enhancement produced by the accumulation layer.

With reference now to the drawings, FIG. 13 shows a typical prior art form of position sensor 100 in which the magnetic circuit comprises an exciter portion 120 of ferromagnetic material made up of a succession of teeth 120A spaced by gaps 120B and a stationary sensing portion comprising the permanent magnet 140 supporting on one surface the sensing element 160 of the present invention and a flux guide 180 for providing a return path for the magnetic field. As shown, the width of each tooth 120A is about equal to the width of the magnet 140 and of the sensing element 160. Optionally, a field concentrator (not shown) may be localized over the sensing element 160 in the form of a thin layer of a high permeability ferromagnetic material.

The exciter 120 typically is a plate with spaced teeth along one edge and is adapted to move horizontally so that its teeth pass under the permanent magnet 140 and the sensing element 160 in accordance with the movement of a position that is being sensed. Alternatively, the exciter may be a circular plate, with teeth around its circumference interspersed with slots, that rotates about a fixed center for varying the position of the teeth relative to the sensing element. The exciter is typically of a high permeability ferromagnetic material, such as iron.

The permanent magnet 140 is polarized vertically in the plane of the paper, as indicated. The sensing element 160 typically is a magnetoresistor, a two-terminal element whose resistance increases with increasing magnetic flux passing vertically through its bulk and typically had nearly the same width as the magnet. The sensing element 160 is as hereinbefore described. The flux guide 180 also is advantageously of a high permeability material, such as iron, and its presence can increase the flux density through the sensing element 160 by providing an efficient return path for the flux passing through the exciter. To this end, the center-to-center spacing of adjacent teeth of the exciter and the center-to-center spacing of the magnetic path formed by the permanent magnet 140 and the flux guide 180 are made essentially equal, as shown. Such a flux guide, however, in fact adds little to the sensitivity and so is unnecessary if adequate flux density is provided, either by a magnet of sufficient thickness or choice of magnet material.

Typical dimensions might be about one millimeter both for the vertical thickness and for the horizontal width of the magnet 140, similarly about one millimeter for the height and width of each tooth 120A, about two millimeters for the width of a gap 120B, and about one millimeter for the separation between a tooth and the magnet in the position shown. The flux guide 180 typically would be of the same scale and would add about another millimeter to the height of the magnet path. The lateral dimension of the magnet normal to the plane of the drawing typically is wide enough to keep low any edge effects in the sensing element.

With a magnetic circuit of this kind, the maximum sensitivity that is obtained tends to be less than about five percent. Moreover, sensors are known in which the stationary part of the magnetic circuit includes a pair of magnetic sensing elements for use as separate legs of a differential sensor. In such cases, the two sensing elements typically are so spaced that when one of the sensing elements is positioned directly opposite one tooth, the other sensing element is positioned directly opposite the center of the gap between adjacent teeth to maximize the difference of the outputs from the time sensing element. Such sensors provide higher sensitivities but at the expense of greater complexity.

In FIG. 14, there is shown a position sensor 200 in accordance with a preferred embodiment of the present invention. Its magnetic circuit includes the exciter 120 that may be similar to the exciter 120 included in the position sensor 100 shown in FIG. 13 and so the same reference numbers are used. The stationary portion of the magnetic circuit is shown in greater detail in FIG. 15. It includes a permanent magnet 220, magnetized vertically as shown, and on its bottom surface there is provided the sensing element 160 that may be similar to sensing element 160 in the position sensor 10 of FIG. 13. In accordance with a feature of the invention, intermediate between the sensing element 160 and the permanent magnet 220, there is included a layer 240 of high permeability magnetic material, such as iron, that covers the entire bottom surface of the permanent magnet 220. Additionally, to ensure that this layer does not electrically short the sensing element 160, there is included an insulating layer 260 intermediate between the sensing element 160 and the layer 240. If the layer 240 were of a non-conducting material, such as high permeability ferrite, the insulating layer 260 would become unnecessary and so might be omitted.

In sensor 200, in accordance with a feature of the invention, for increased sensitivity, the width W of the permanent magnet 220 is considerably wider than the typical width of the prior art sensor 100 shown in FIG. 13. Advantageously, the width of the permanent magnet 220 is made to be the sum of the width of one tooth and two gaps of the exciter, as shown, as seen in FIG. 14, and so about one and one-half times the pitch of the teeth of the exciter. By way of contrast, in the position sensor 100 shown in FIG. 13, the width of the permanent magnet 140 essentially matches that of a tooth 120A of the exciter. Moreover, the improvement in sensitivity provided by this increase in magnet width is further augmented by the presence of the magnetic layer 240.

For maximum magnetic sensitivity, in our design, it is another feature that the width of the sensing element 160 is desirably as narrow as is convenient. However, for electrical circuit efficiency, it is desirable that the element 160 have a sufficiently high resistance, for example, at least 100 ohms, which imposes practical limits on how narrow the element may be. Also, the sensing element 160 needs to be wide enough to have adequate power dissipation capabilities. Nevertheless, the sensing element 160 typically would be significantly narrower than the tooth element 120A unless the exciter design involved unusually narrow teeth. As shown, the sensing element 160 is provided at opposite ends with electrodes 160a and 160b by means of which it may be connected into an appropriate electrical circuit. These are typically metallic platings deposited on the insulating layer 260. The ferromagnetic layer illustratively can be about 0.1 millimeter thick and of a material such as low carbon steel 1008. The result is a geometry made up of a series of planar layers that is easy to manufacture.

The sensing element 160 is a magnetoresistor of the present invention heretofore described. We prefer that the magnetic field be applied perpendicularly to the major face of the sensing area in the sensing element 160.

Figure 16A:
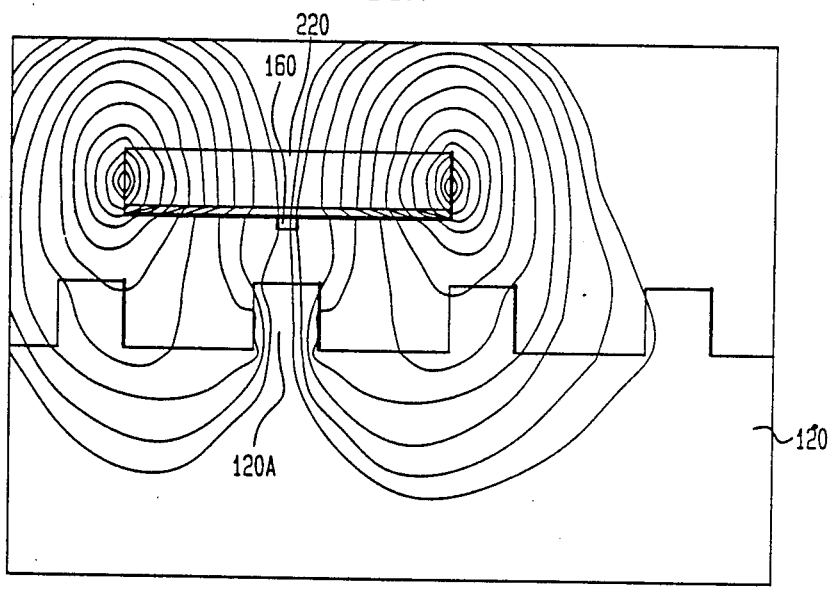
FIGS 16A and 16B show the magnetic circuit of FIG. 14 for two different positions of its permanent magnet relative to the exciter.
Figure 16B:
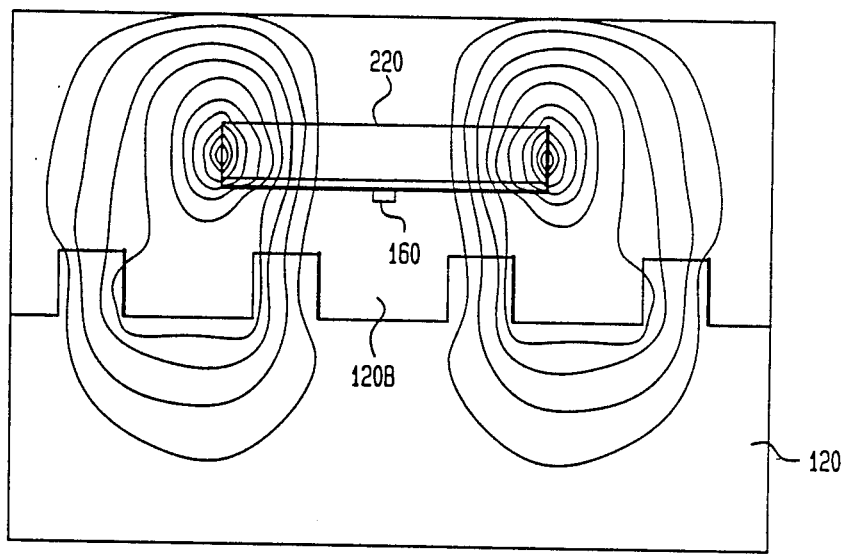

FIGS. 16A and 16B illustrate the conditions for maximum and minimum flux through the sensing element 160, respectively, for the position sensor 200 shown in FIG. 14. As seen in FIG. 16A, when the sensing element 160 is directly opposite a tooth 120A of the exciter, the flux density represented by lines through sensing element 160 is comparatively high. However, when the exciter has moved so that the sensing element 160 is opposite the center of a gap 120B between teeth, the flux density through the sensing element 160 is comparatively less. Typically, the maximum flux density may be 0.2 Tesla, and the minimum flux 0.15 Tesla, for a 2 millimeter thick MQ2 magnet. MQ2 magnet material is an NdFeB alloy that has an energy product between 13 and 15 MGOe, is isotropic and 100 percent dense and is a trademarked product of General Motors Corporation.

The role of the ferromagnetic layer 240 makes it easier for the flux to travel towards or away from the sensing element 160, thus increasing the maximum flux and decreasing the minimum flux that passes through the sensing element, and thereby increasing the sensitivity, which is dependent on the difference between the maximum and minimum fluxes sensed.

In particular, the movement of the exciter teeth little affects the total flux density but does vary the spatial distribution of the flux density along the width of the magnet, creating sharp local flux density variations that can be sensed by a localized sensing element, such as a magnetoresistor. The ferromagnetic layer permits the flux density to be distributed along the magnet width in a way that reflects the profile of the air gap between the stationary portion of the magnetic circuit and the exciter. Where this air gap is narrow, the flux density is high; where this gap is wide, the flux density is low. Since this air "gap" is narrowest alongside a tooth of the exciter, the flux density there will be highest, and this density peak will follow the tooth movement along the width of the magnet. In particular, our tests have shown that the addition of the thin ferromagnetic layer 240 in the manner described can essentially double the sensitivity of a sensor with an already optimum width magnet. The optimum thickness of the ferromagnetic layer is determined by the maximum flux density it is desired to guide without saturation. Layers even as thin as five microns have proven to be useful for a sensed maximum flux density of about 0.12 T. For this flux density, improvement tends to level off when the thickness reaches about 25 microns.

The magnetic layer 240 can be provided simply as a thin metallic foil attached to the surface of the permanent magnet 220 using conventional adhesives. Alternatively, magnets manufactured by compressing and/or sintering magnetic powder can produce a ferromagnetic layer as an integral part of the permanent magnet. To this end, there is introduced into the die cavity an appropriate amount of iron powder, before or after the magnetic powder is introduced, and then the powders are compressed together. Moreover, the planar geometry makes feasible batch-processing whereby hundreds of magnetoresistors may be deposited simultaneously on a relatively thin unmagnetized permanent magnet wafer having a ferromagnetic layer and an insulating layer. The wafer would then be cut into separate sensors, the sensors packaged, and the permanent magnets magnetized.

It appears that the increase in sensitivity is achieved at the expense of a lowering of the mean flux density. If this is of concern for effective modulation of the particular magnetoresistor being used, the mean flux density can be increased to the desired level with little effect on the sensitivity by increasing the thickness of the magnet and/or the magnet type, thereby maintaining the desired planarity of the sensor and avoiding the need for a flux guide to improve flux density. However, in special instances where neither of these expedients is adequate, a flux guide may be induced to improve the flux density involving teeth further along the exciter.

In order to translate optimally the high magnetic sensitivity of the magnetic circuit described into high electrical sensitivity, the sensing element needs to be appropriately positioned on the magnet.

Figure 17:
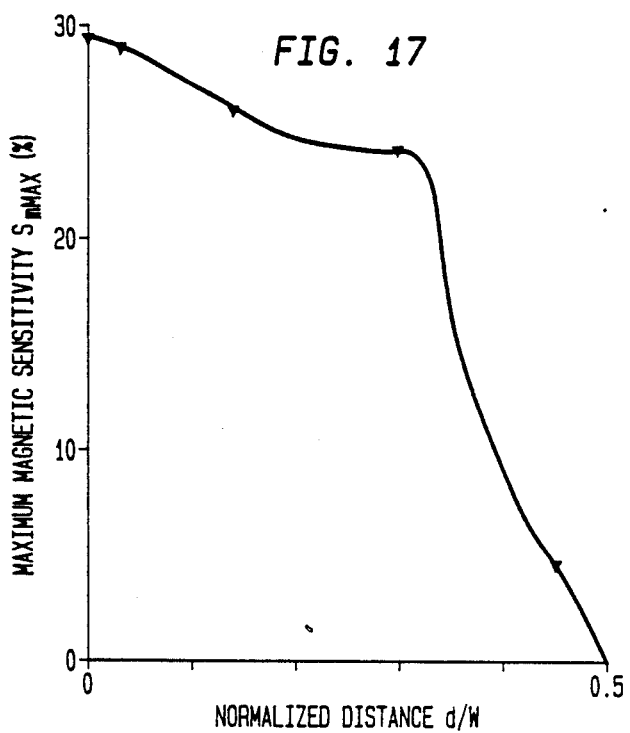
FIGS. 17 and 18 are graphical plots useful in discussing design considerations of the invention.

FIG. 17 graphically shows a typical envelope of maximum attainable sensitivity plotted against the normalized distance d/W of the sensing element where d is the distance from the midpoint of the magnet of width W. It can be seen that the peak attainable sensitivity is at the midpoint of the magnet (d=0) and at a minimum at each end of the magnet (d/W=0.5). Accordingly, the optimum location of the sensing element is at the midpoint of the magnet It is also important to have a proper width for the sensing element 160, particularly when the element is a magnetoresistor that produces an electrical output signal corresponding to the average of the flux density across its surface.

The flux density distribution along the length of the magnetoresistor, however, can be assumed to be constant. Thus, one is required to consider the flux density or sensitivity distributions only along the magnetoresistor width. Because of that, the effective electrical sensitivity will be directly related to the average magnetic sensitivity as determined by integrating the magnetic sensitivity distribution given in FIG. 18 over the magnetoresistor width WMR.

Figure 18:
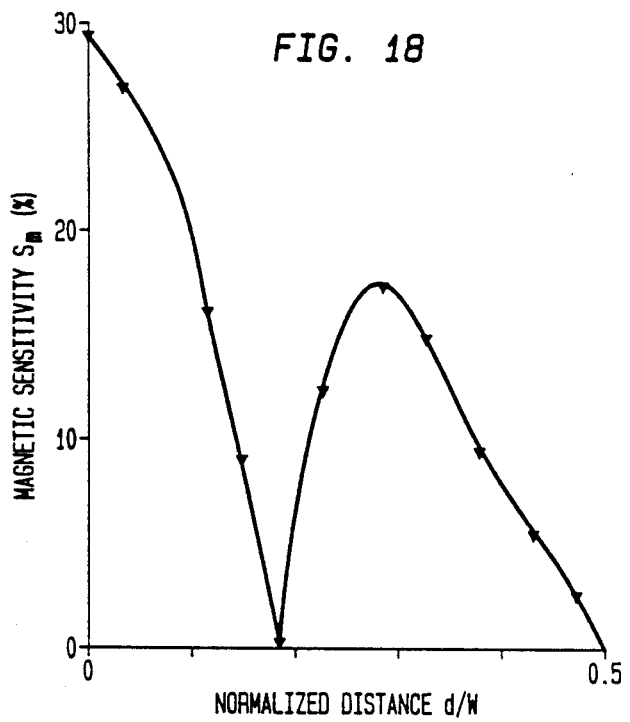

FIG. 18 graphically shows magnetic sensitivity versus normalized distance to illustrate how the sensitivity varies along the magnet width for the alignment shown in FIGS. 16A and 16B. Looking at the sensitivity distribution, one would tend to maximize the electrical sensitivity by attempting to make WMR as small as possible. Small size, however, would lower the resistance and power dissipation capability of the magnetoresistor, and in turn lead to a lower output signal. The selection of WMR has to be a compromise which takes into account several conflicting requirements such as the practical limitations on the magnetoresistor length, the best possible sensitivity, sufficiently large resistance and power dissipation, the lowest possible magnetoresistor cost (smaller magnetoresistors are generally less expensive), etc. Considering previously available magnetoresistor technology, the minimum practical value of WMR for the exciter design that has been discussed appears to be about 0.3 mm which amounts to d/W =0.033 and yields an effective magnetic sensitivity SM of about 28 percent. We do not know at this time how this is affected by the improved magnetoresistor contemplated in this invention. A 0.6 mm width would still provide sensitivity of about 26 percent. The width WMR, in any case, desirably should be less than the width of the teeth in the usual design. The height of the sensing element may be small, typically tens of microns, whereby the planarity of the associated surface is little disturbed by its presence.

It is also found in our design that the ratio of tooth width T to tooth pitch P also affects sensitivity. It has been found that the sensitivity tends to be maximum for T/P ratios of about 0.25 but to remain relatively flat over the range between 0.17 and 0.37.

It is also found in our design that the tooth pitch affects sensitivity and, in particular, that increasing the tooth pitch can appreciably increase the sensitivity. For example, for the design discussed, a change in pitch from 3mm to 5mm can increase the maximum sensitivity to about 58 percent when conditions are optimized. Since sensitivity decreases with increasing air gap size between the exciter and the magnet, increasing the tooth pitch offers a way to compensate for larger air gap sizes and offers a designer an ability to trade off between air gap width and tooth pitch.

In addition, it is found that the stationary portion of a sensor of the kind described can be used effectively with a broad range of exciter which tooth pitch sizes. This feature offers a considerable cost saving potential, for example, for applications such as ABS designs that employ widely differing tooth pitch sizes. If a sensor of a particular stationary design is intended to operate with wheels having different tooth pitch sizes, the magnet width preferably should be chosen to optimize the sensor for the smallest tooth pitch size so that the lowest sensitivity, encountered when using the exciter wheel of smallest tooth pitch size, will be as high as possible. As previously discussed, the optimum magnet width is about 1.5 times the tooth pitch size.

It is to be understood that the specific embodiments described are merely illustrative of the general principles of the invention and various modifications may be devised without departing from the spirit and scope of the invention. For example, it is feasible to reverse the roles of the stationary portion and the movable portion of the position sensor. Additionally, the various dimensions and materials mentioned are merely illustrative of a typical design, and other designs could necessitate other dimensions and materials.

The embodiments of the invention in which an exclusive property or privilege is claimed are defined as follows:

1. A position sensor providing unamplified electrical output changes of the order of one volt in response to changes in applied magnetic field over a temperature range of several hundred degrees Centigrade;
   said position sensor including a magnetic circuit that comprises;
   an exciter portion including a series of teeth spaced apart by gaps for defining a tooth pitch, and a sensing portion for relative movement therebetween;
   said sensing portion including a permanent magnet having a width at least several times wider than the width of an exciter tooth and supporting a magnetoresistive sensing element;
   said magnetoresistive sensing element including a thin film of monocrystalline indium arsenide having inner and outer surfaces, with the inner surface being supported on a substantially electrically insulating monocrystalline indium phosphide substrate;
   said indium arsenide film including a substantially rectangular sensing area having an electrical conductor extending along the length of each long edge of the rectangular sensing area, and also having a dimension along its short edges that is about 10%–60% that of its long edges;
   said exciter tooth having a width that is greater than dimensions of said sensing area; and
   said thin film of indium arsenide being approximately 1 to 3 micrometers thick and nominally undoped, and having an average electron density of the order of $10^{16}$ electrons per cubic centimeter or lower and an average electron mobility of about 10,000 to 32,000 cm$^2$volt$^{-1}$second$^{-1}$ but which exhibits a magnetic sensitivity and temperature insensitivity as if the indium arsenide film were at least an order of magnitude thinner, had an electron density at least an order of magnitude greater, and a significantly higher mobility.

2. A position sensor providing unamplified electrical output changes of the order of one volt in response to changes in applied magnetic field over a temperature range of several hundred degrees Centigrade;

said position sensor including a magnetic circuit that comprises:

an exciter portion including a series of teeth spaced apart by gaps for defining a tooth pitch, and a sensing portion for relative movement therebetween;

said sensing portion including a permanent magnet having a width at least several times wider than the width of an exciter tooth and supporting a magnetoresistive sensing element;

said magnetoresistive sensing element including a thin film of monocrystalline indium arsenide having inner and outer surfaces, with the inner surface being supported on a substantially electrically insulating monocrystalline indium phosphide substrate;

said indium arsenide film including a substantially rectangular sensing area having an electrical conductor extending along the length of each long edge of the rectangular sensing area, and also having a dimension along its short edges that is about 10% to 60% that of its long edges;

said exciter tooth having a width that is greater than dimensions of said sensing area; and said thin film of indium arsenide being about 1 to 3 micrometers thick and nominally undoped, and having an average electron density of the order of $10^{16}$ electrons per cubic centimeter or lower and an average electron mobility of about 10,000 to 32,000 $cm^2 volt^{-1} second^{-1}$; and an electron accumulation layer adjacent the outer surface of said indium arsenide thin film and extending entirely across the sensing area between the conductors contacting its long edges, which accumulation layer has an electron density at least an order of magnitude higher than said average electron density and an electron mobility significantly greater than said average electron mobility, effective to provide a magnetic sensitivity and range of operating temperature as if the indium arsenide thin film were much thinner and had a much higher electron density and electron mobility.

3. The position sensor of claim 1 in which the magnet width is about 1.5 times the tooth pitch, the magnetoresistive sensing element includes a plurality of said thin film sensing areas, said plurality of areas are electrically in series, and said plurality of sensing areas are disposed in a combined area having a maximum dimension less than the width of said exciter tooth.

4. In a position sensor that includes a magnetic circuit characterized by an exciter portion including teeth spaced apart by gaps and a sensing portion for relative movement therebetween, wherein the sensing portion includes a permanent magnet having one surface approximate the exciter portion and being relatively wide compared to the width of an exciter tooth, a layer of high permeability magnetic material over said one surface, and a magnetic sensing element on said layer positioned along a limited portion intermediate between the two ends of the permanent magnet, the improvement wherein:

the magnetic sensing element includes a thin film of a monocrystalline semiconductive material having only a moderate average current carrier density and moderate average current carrier mobility, and a band gap of at least 0.36 electron volt;

a sensing area in said thin film; and an accumulation layer in said thin film extending across said sensing area and disposed adjacent a surface of said thin film, where said current carriers can preferentially flow between conductive portions contacting opposed edges of said sensing area effective to provide an apparent increase in carrier mobility and concentration in said semiconductive material, an apparent reduction in thickness of said film, and an actual improvement in the magnetic sensitivity of said film and in temperature insensitivity of the magnetic sensitivity of said film.

5. The position sensor of claim 4 in which the magnetic layer is coextensive with said one surface of the permanent magnet.

6. The position sensor of claim 5 in which said sensing element is substantially centered between the two ends of the permanent magnet and includes a plurality of said thin film sensing areas, said plurality of sensing areas are electrically in series, and said plurality of sensing areas are disposed in a combined area having a maximum dimension less than the width of said exciter tooth.

7. The position sensor of claim 5 in which the width of the sensing element is less than the width of a tooth.

8. The position sensor of claim 6 in which the width of said permanent magnet is approximately 1.5 times the tooth pitch of the exciter portion.

9. The position sensor of claim 8 in which the tooth width is between about 0.17 and 0.37 the tooth pitch.

10. The position sensor of claim 9 in which the tooth width is about 0.25 the tooth pitch.

11. In a position sensor that includes a magnetic circuit characterized by an exciter portion including teeth spaced apart by gaps and a sensing portion for relative movement therebetween, wherein the sensing portion includes a permanent magnet having one surface approximate the exciter portion and being relatively wide compared to the width of an exciter tooth, a layer of high permeability magnetic material over said one surface, and a magnetic sensing element on said layer positioned along a limited portion intermediate between the two ends of the permanent magnet, the improvement wherein:

the magnetic sensing element includes a thin film of a monocrystalline semiconductive material having only a moderate average current carrier density and moderate average current carrier mobility, and a band gap of at least 0.36 electron volt;

a sensing area in said thin film;

an accumulation layer in said thin film extending across said sensing area and disposed adjacent a surface of said thin film, where said current carriers can preferentially flow between conductive portions contacting opposed edges of said sensing area; and means for maintaining said accumulation layer in said film during use of the position sensor without requiring more than two electrical contacts to said sensing element effective to provide an apparent increase in carrier mobility and concentration in said semiconductive material, an apparent reduction in thickness of said film, and an actual improvement in the magnetic sensitivity of said film and in temperature insensitivity of the magnetic sensitivity of said film.

12. The position sensor of claim 11 wherein the semiconductive material of the thin film is indium arsenide, and the means for maintaining the accumulation layer in the thin film is a dielectric coating on the indium arsenide thin film.

13. The position sensor of claim 11 in which the width of said magnet is approximately one and one-half times the tooth pitch of the exciter portion, the magnetoresistive sensing element includes a plurality of said thin film sensing areas, said plurality of areas are electrically in series, said plurality of sensing areas are disposed in a combined area having a maximum dimension less than the width of said exciter tooth, and the means for maintaining said accumulation layer in said film during use of said sensing element is a coating that creates the accumulation layer in the thin film.

14. The position sensor of claim 13 in which the coating includes a conductive electrode layer for inducing an electric field in the thin film to create the accumulation layer, and the means for maintaining the accumulation layer further includes electrical biasing means interconnecting the conductive electrode layer with said conductive portions contacting opposed edges of said sensing area.

15. The position sensor of claim 13 in which the tooth width is between about 0.17 and 0.37 the tooth pitch.

16. A position sensor comprising:
   a stationary portion and an exciter portion adapted to move past said stationary portion;
   said stationary portion including a permanent magnet having a planar major surface normal to the polarization of the magnet, a ferromagnetic layer overlying said major surface, and a sensing element centered along the width of said surface over said layer, the width of said sensing element being substantially less than the width of said magnet;
   said exciter portion including a succession of teeth spaced apart by gaps, the width of each of said teeth being less than the width of each of said gaps and more than the width of said sensing element;
   said magnetoresistive sensing element including a thin film of monocrystalline nominally undoped indium arsenide supported on a substantially electrically insulating monocrystalline indium phosphide substrate;
   said thin film having a thickness of less than about 3 micrometers and a generally rectangular sensing area;
   substantially parallel conductors contacting said thin film for injecting current carriers into opposed edges of said sensing area;
   said sensing area having a dimension in a direct path between said conductors that is significantly shorter than its dimension parallel to said conductors; and
   said sensing area dimensions are less than the width of said exciter tooth.

17. The position sensor of claim 16 in which said sensing element has a plurality of sensing areas, the plurality of sensing areas are successively disposed in an elongated portion of the thin film, with each sensing area extending across the entire width of the elongated portion, and a conductor extends across the entire width of the elongated portion on opposite sides of each sensing area, wherein the length of the elongated portion of the film has a dimension less than the width of said exciter tooth.

18. The position sensor of claim 4 in which the semiconductor material is an arsenide or antimonide of indium.

19. The position sensor of claim 18 in which the semiconductor film is of a thickness no greater than 3 micrometers.

20. The position sensor of claim 19 in which the areal electron density of the accumulation layer is substantially larger than the areal electron density of the bulk of the film.

21. The position sensor of claim 20 in which the average electron density of the bulk of the film is in the order of $10^{16}$ electrons per cubic centimeter.

22. The position sensor of claim 21 in which the film has an average electron mobility of 10,000 to 32,000 $cm^2\ volt^{-1}\ second^{-1}$.

* * * * *